United States Patent
Bradley

(10) Patent No.: US 11,239,654 B1
(45) Date of Patent: Feb. 1, 2022

(54) SURGE PROTECTION DEVICE FOR COMPLEX TRANSIENTS

(71) Applicant: Arthur Thomas Bradley, Yorktown, VA (US)

(72) Inventor: Arthur Thomas Bradley, Yorktown, VA (US)

(73) Assignee: Faraday Defense Corporation, Portage, MI (US)

( * ) Notice: Subject to any disclaimer, the term of this patent is extended or adjusted under 35 U.S.C. 154(b) by 378 days.

(21) Appl. No.: 16/282,270

(22) Filed: Feb. 21, 2019

Related U.S. Application Data

(60) Provisional application No. 62/794,587, filed on Jan. 19, 2019.

(51) Int. Cl.
    *H02H 9/00* (2006.01)
    *H02H 3/16* (2006.01)
    *H02H 3/02* (2006.01)
    *H02H 1/04* (2006.01)
    *H02H 9/04* (2006.01)

(52) U.S. Cl.
    CPC .............. *H02H 9/005* (2013.01); *H02H 1/04* (2013.01); *H02H 3/023* (2013.01); *H02H 3/162* (2013.01); *H02H 9/04* (2013.01)

(58) Field of Classification Search
    CPC .............................................. H02H 9/041–043
    See application file for complete search history.

(56) References Cited

U.S. PATENT DOCUMENTS

| | | | |
|---|---|---|---|
| 4,553,189 A | 11/1985 | Pivit | |
| 4,669,027 A | 5/1987 | Elsner | |
| 5,144,517 A * | 9/1992 | Wieth | H02H 3/023 361/104 |
| 5,388,021 A * | 2/1995 | Stahl | H02H 9/005 361/104 |
| 5,978,198 A * | 11/1999 | Packard | H02H 9/042 361/111 |
| 6,226,162 B1 * | 5/2001 | Kladar | H02H 3/44 361/111 |
| 6,392,318 B1 | 5/2002 | Griffis | |

(Continued)

FOREIGN PATENT DOCUMENTS

EP 2244353 A2 10/2010
WO WO2019139933 7/2019

*Primary Examiner* — Thienvu V Tran
*Assistant Examiner* — Nusrat Quddus
(74) *Attorney, Agent, or Firm* — Patents and Licensing LLC; Daniel W Juffernbruch

(57) ABSTRACT

A three-stage surge protection device protects against complex, time-variant voltage transients, including those resulting from a high-altitude nuclear electromagnetic pulse or a solar coronal mass ejection. The device relies on interaction between a snubbing low-pass filter, a transient voltage suppressor, and an electronic crowbar circuit. The low-pass filter significantly lowers the let-through voltage of the device for short-duration pulses, and helps to spread the energy to more effectively utilize the transient voltage suppressor. The transient voltage suppressor limits the let-through voltage to a clamping level and provides indication to the crowbar circuit when it is no longer able to do so. Once the clamping level is no longer able to be maintained, the crowbar circuit draws enough current to trip an upstream protective device, such as a breaker or fuse.

50 Claims, 15 Drawing Sheets

(56) References Cited

U.S. PATENT DOCUMENTS

| | | |
|---|---|---|
| 6,847,514 B2 | 1/2005 | Ramarge |
| 9,450,410 B2 | 9/2016 | Moore |
| 10,530,151 B2 | 1/2020 | Carty |
| 2010/0127625 A1 | 5/2010 | Minarczyk |
| 2012/0147509 A1* | 6/2012 | Mechanic ............... H02H 9/041 361/49 |
| 2012/0194152 A1* | 8/2012 | Martinelli ............. H02M 3/158 323/282 |
| 2015/0004847 A1 | 1/2015 | Namkoong |
| 2016/0126738 A1 | 5/2016 | Moore |
| 2016/0197469 A1 | 7/2016 | Fuchs |
| 2017/0187181 A1* | 6/2017 | Kashyap ................ H02H 9/041 |
| 2018/0136267 A1 | 5/2018 | Tao |
| 2019/0036326 A1 | 1/2019 | Anderson |
| 2019/0214814 A1 | 7/2019 | Carty |

\* cited by examiner

US 11,239,654 B1

SURGE PROTECTION DEVICE FOR COMPLEX TRANSIENTS

CROSS-REFERENCE TO RELATED APPLICATIONS

This application claims priority benefits under 35 U.S.C. §§ 119(e) and 120 to U.S. provisional application No. 62/794,587 filed on Jan. 19, 2019. Such provisional application(s) are incorporated herein by reference as if set forth in full herein.

BACKGROUND OF THE INVENTIONS

1. Technical Field

The present inventions relate to surge protection devices and, more particularly, relate to surge protection devices designed to protect electronics from conducted transients.

2. Description of the Related Art

Conventional surge protection devices (SPDs) almost universally use metal-oxide varistors (MOVs) placed between the power and return lines. The MOVs begin conducting at high voltages, thereby shunting away unwanted energy and acting to limit the voltage that the subsequent load experiences. However, MOVs and other transient voltage suppressors, including transient voltage suppression diodes (TVS diodes), gas discharge tubes (GDTs), and avalanche diodes, have a finite turn-on time that is typically in the tens of nanoseconds or greater. This limits their effectiveness against very fast transients. Also, transient voltage suppressors have a maximum amount of energy that they can dissipate before overheating and suffering catastrophic failure. For long-duration transients, i.e., those that last milliseconds or longer, conventional MOV-based surge protection devices overheat and fail. The same is true for designs based on other transient voltage suppressors, including transient voltage suppression diodes, gas discharge tubes, or avalanche diodes.

Based on knowledge, no surge protection devices incorporate the combination presented in this invention disclosure. The closest technology found was that of a ground-fault circuit interrupter (GFCI), which detects an imbalance of current flowing in versus out and opens a breaker under such a condition. It is distinctly different than this invention in a number of ways. First, a GFCI detects a current imbalance, whereas this invention detects an overvoltage condition. Second, it does not use a transient voltage suppressor, or any of the circuitry disclosed in this invention to limit the imbalance or trigger the protective breaker. Third, a GFCI is a safety device designed to protect users from electrocution. The invention described is a surge protection device designed to protect electronics from damage, not users from harm. Finally, the GFCI opens a protective breaker as a result of an unwanted fault current, whereas the invention intentionally creates an overcurrent condition to trip an upstream protective device.

BRIEF DESCRIPTION OF THE DRAWINGS

The present inventions are illustrated by way of example and are not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein.

DETAILED DESCRIPTION OF THE PREFERRED EMBODIMENTS

Conventional SPDs are unable to protect from complex transient waveforms that contain short-duration (i.e., nanoseconds or less), medium-duration (i.e., microseconds to milliseconds), and long-duration (i.e., >milliseconds) components. The invention described provides such protection using a three-stage design, each targeting the different transient time domains. The invention relies on the three stages working in conjunction in non-obvious ways to suppress complex conducted transients.

Figure 1:
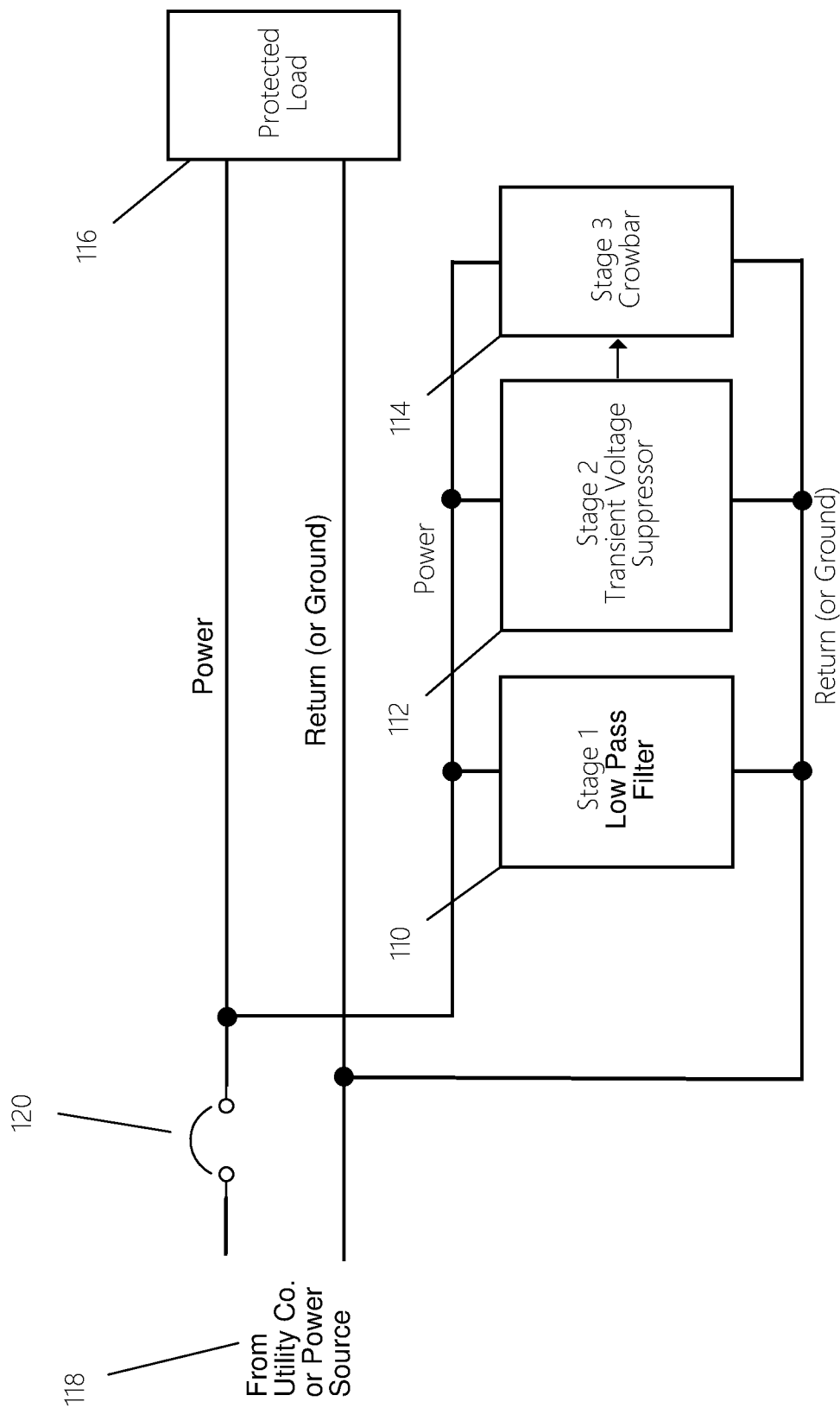
FIG. 1 illustrates a block diagram showing an upstream protective device, a protected load, and the three distinct stages of the surge protection device according to embodiments of the present inventions.

FIG. 1 illustrates a block diagram showing an upstream protective device, a protected load, and the three distinct stages of the surge protection device according to embodiments of the present inventions. The invention describes a new surge protection device (SPD) that guards against complex transient disturbances that may contain a combination of short-, medium-, and long-duration components. The design incorporates a novel three-stage protection system that can be wired in series or parallel with a protected load 116 and takes advantage of an upstream protective device 120, such as a breaker or fuse. Power is shown coming in from an external power source, such as a utility company 118. If the upstream protective device 120 were included in the SPD, the same design could be wired in series with the protected load 116. The first stage of the SPD is a low-pass filter 110, the second a transient voltage suppressor 112, and the third a crowbar 114.

Figure 2:
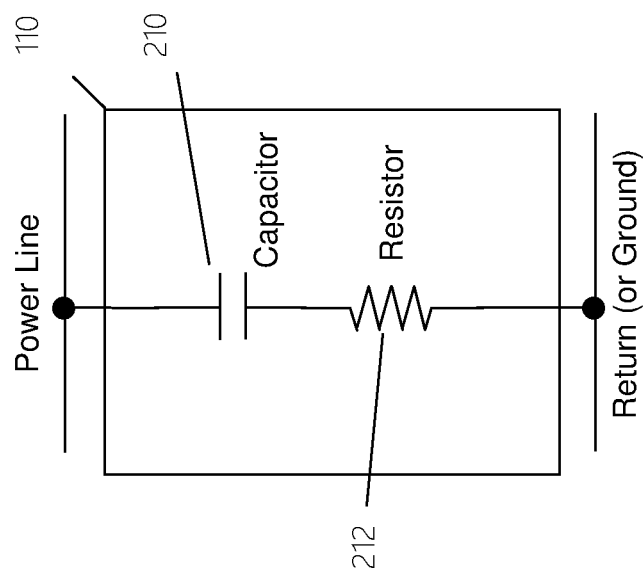
FIG. 2 illustrates a schematic diagram showing the first stage of the surge protection device, the low-pass filter. This particular embodiment shows a simple capacitor and anti-ringing (aka. snubbing) resistor according to embodiments of the present inventions.

FIG. 2 illustrates a schematic diagram showing the first stage of the surge protection device, the low-pass filter 110. This particular embodiment shows a simple capacitor and anti-ringing (aka. snubbing) resistor according to embodiments of the present inventions. The SPD's first stage 110, as seen in FIG. 2, consists of a resistor 212 and a series capacitor 210. Together, they form an RC snubber circuit that reduces the amplitude of the transient, slows the risetime, and spreads the transient out in time without introducing potentially damaging ringing to, or unwanted turn on of, the subsequent stages. The capacitor 210 limits the rise and fall times of the line voltage, and the resistor 212 dissipates some of the transient energy in the form of heat. Together, they act to significantly reduce the let-through voltage of short-duration transients, and moderately reduce the let-through voltage of medium-duration transients. In this simple embodiment, a capacitor and series resistor are used, but any low-pass filter topology would be applicable. The filter components, i.e., the values of the capacitor 210 and resistor 212 in this case, can be optimized such that the corner frequency of the filter will adequately suppress the waveform of greatest concern to the user. The resistor 212 is included to reduce the potential ringing that may result on the power line. It can be adjusted or eliminated, depending on the transient waveform and the tolerance to ringing of both the surge protection device and the protected load 116.

Figure 3:
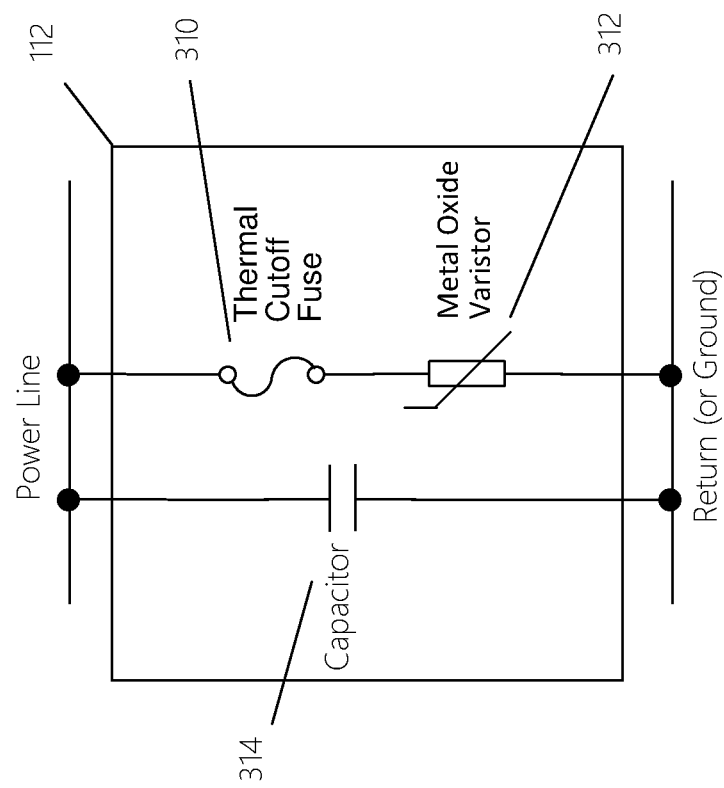
FIG. 3 illustrates a schematic diagram of the second stage of the surge protection device, the hybrid transient suppression filter. This particular embodiment shows a metal oxide varistor, a parallel capacitor, and a thermal cutoff fuse according to embodiments of the present inventions.

FIG. 3 illustrates a schematic diagram of the second stage of the surge protection device, the hybrid transient suppression filter 112. This particular embodiment shows a metal oxide varistor, a parallel capacitor, and a thermal cutoff fuse according to embodiments of the present inventions. The second stage, shown in FIG. 3, is a thermally-protected transient voltage suppressor 312 and thermal cutoff fuse 310, placed in parallel with a capacitor 314. Transient voltage suppressors (a.k.a. transient suppression devices) may include metal oxide varistors, transient voltage suppression diodes, gas discharge tubes, and avalanche diodes. In this embodiment, a metal oxide varistor is shown. Together, the transient voltage suppressor 312 and capacitor 314 act as a hybrid filter, which offers excellent attenuation of medium-duration transients. The inclusion of the parallel capacitor 314 lowers the let-through voltage seen at the protected load 116 and could be adjusted or eliminated based on what is deemed acceptable performance. The thermal cutoff fuse 310 is recommended, but not required, and could be included in the transient voltage suppressor's package, or it could be a separate fuse placed in close proximity to the transient voltage suppressor 312.

Figure 4:
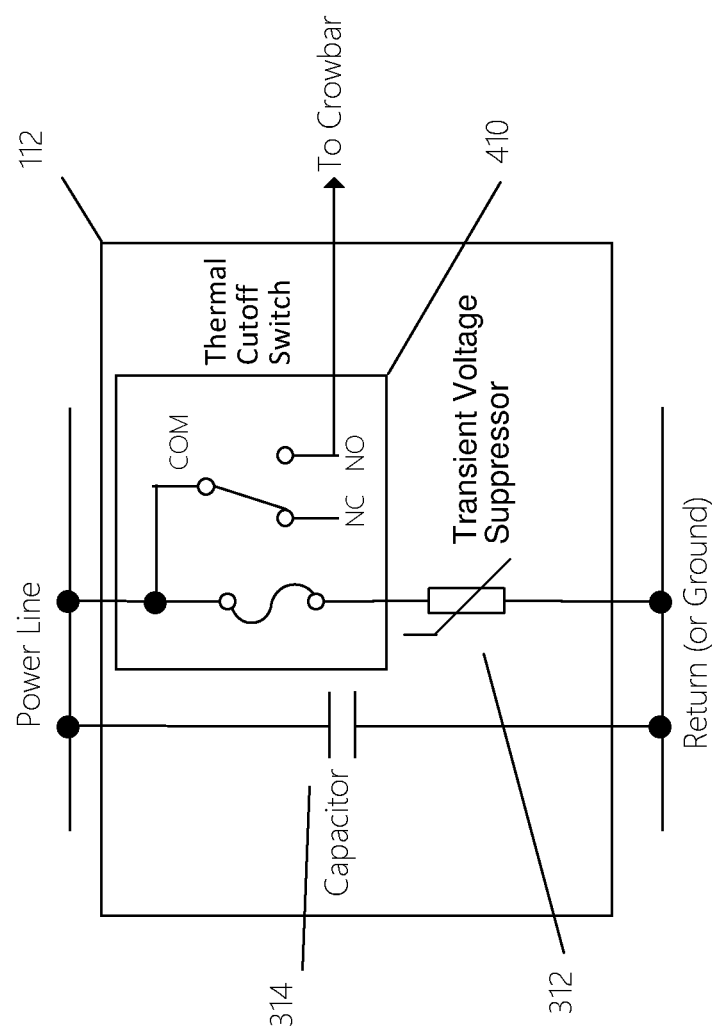
FIG. 4 illustrates a schematic diagram of the second stage of the surge protection device. This particular embodiment shows a metal oxide varistor, a parallel capacitor, and a thermal cutoff switch according to embodiments of the present inventions.

FIG. 4 illustrates a schematic diagram of the second stage 112 of the surge protection device. This particular embodiment shows a metal oxide varistor 312, a parallel capacitor 314, and a thermal cutoff switch 410 according to embodiments of the present inventions. If a thermal cutoff switch 410 is used, as shown in FIG. 4, it can readily be used to activate the third stage (aka the crowbar circuit 114) as well as provide indication of a failure due to overheating from excessive current.

Figure 5:
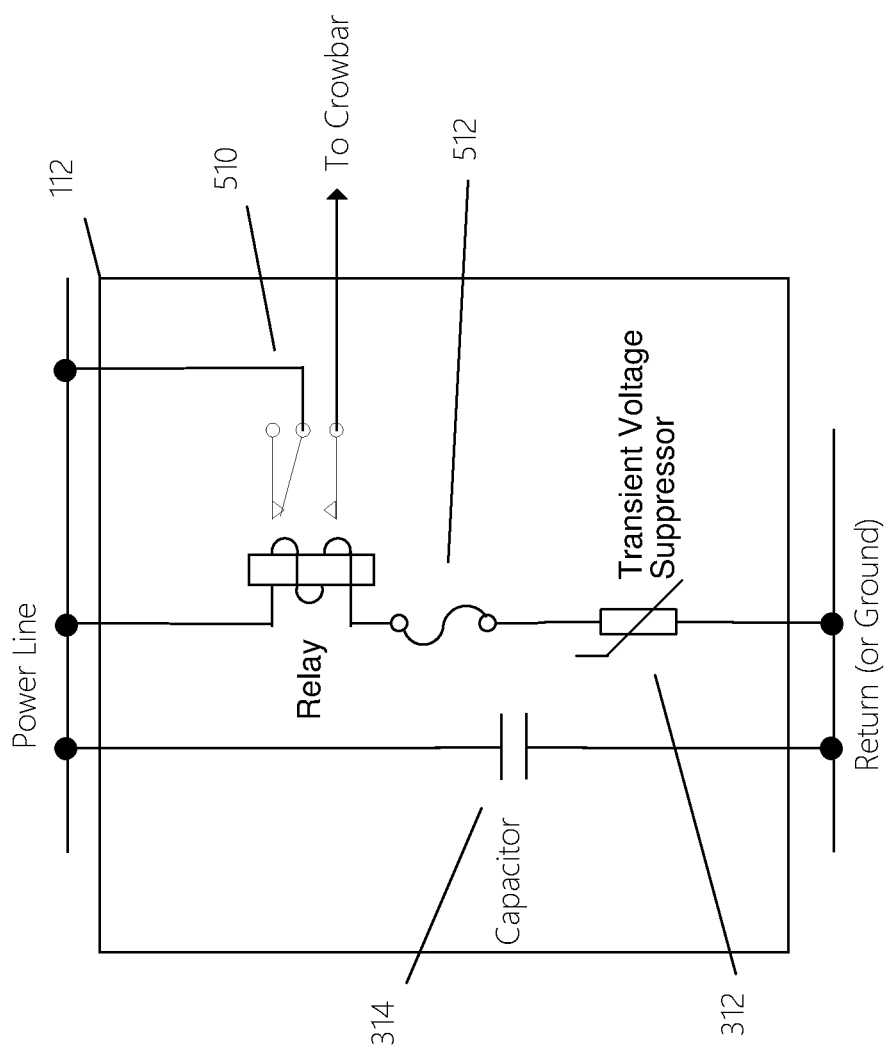
FIG. 5 illustrates a schematic diagram of a thermal cutoff fuse and relay being used to provide a gating signal to the subsequent crowbar according to embodiments of the present inventions.

FIG. 5 illustrates a schematic diagram of a thermal cutoff fuse 512 and relay 510 being used to provide a gating signal to the subsequent crowbar 114 according to embodiments of the present inventions. If a thermal cutoff switch 410 is not available, it can be created by connecting a thermal cutoff fuse 512 in series with a normally-closed relay 510, as shown in FIG. 5. The relay could be configured to pass current to the crowbar circuit 114 when the thermal cutoff fuse 512 opened due to an overcurrent condition.

Figure 6:
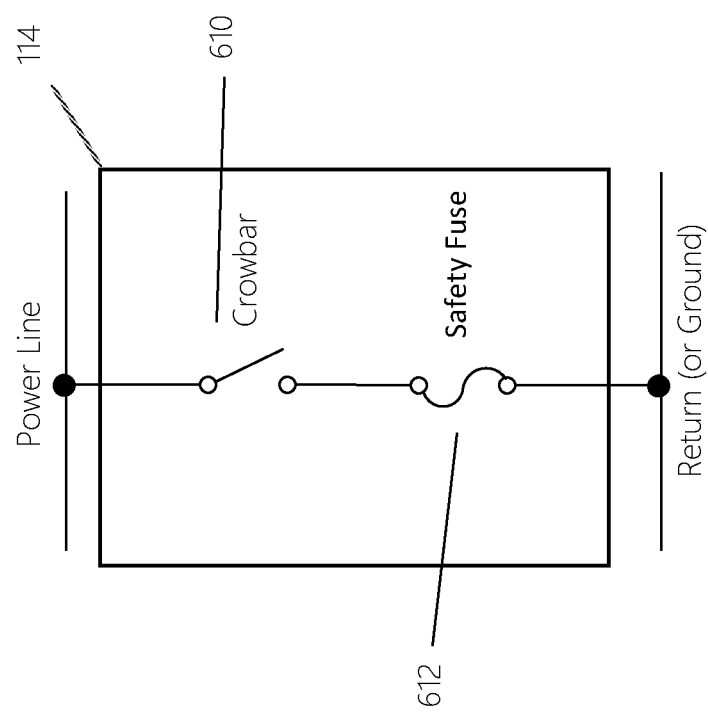
FIG. 6 illustrates a schematic diagram of the third stage of the surge protection device, the crowbar. This particular embodiment shows a generalized crowbar and a safety fuse according to embodiments of the present inventions.

FIG. 6 illustrates a schematic diagram of the third stage of the surge protection device, the crowbar 114. This particular embodiment shows a generalized crowbar 610 and a safety fuse 612 according to embodiments of the present inventions. Finally, the third stage 114, shown in FIG. 6, is a crowbar circuit that, when activated, directly shorts the input power line(s) to return.

Figure 7:
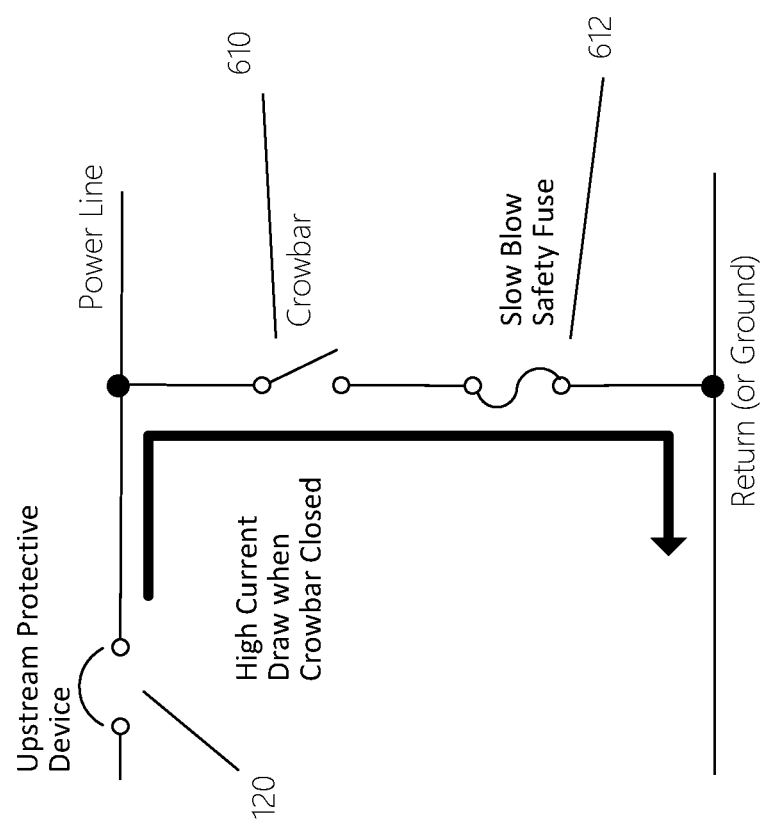
FIG. 7 illustrates a schematic diagram showing how the crowbar switches a fault current to activate an upstream protective device, such as a breaker or fuse according to embodiments of the present inventions.

FIG. 7 illustrates a schematic diagram showing how the crowbar 610 switches a fault current to activate an upstream protective device 120, such as a breaker or fuse according to embodiments of the present inventions. In the case of an AC system, it would short the Line 1 or Line 2 to Neutral and/or Ground as shown in FIG. 7. The purpose of the crowbar 610 is to draw enough current to activate an upstream protective device 120, such as a breaker or fuse. The crowbar circuit 114 can be designed such that it is always enabled but not activated, or it can only be designed such that it is enabled only when the transient voltage suppressor 312 has failed.

Figure 8:
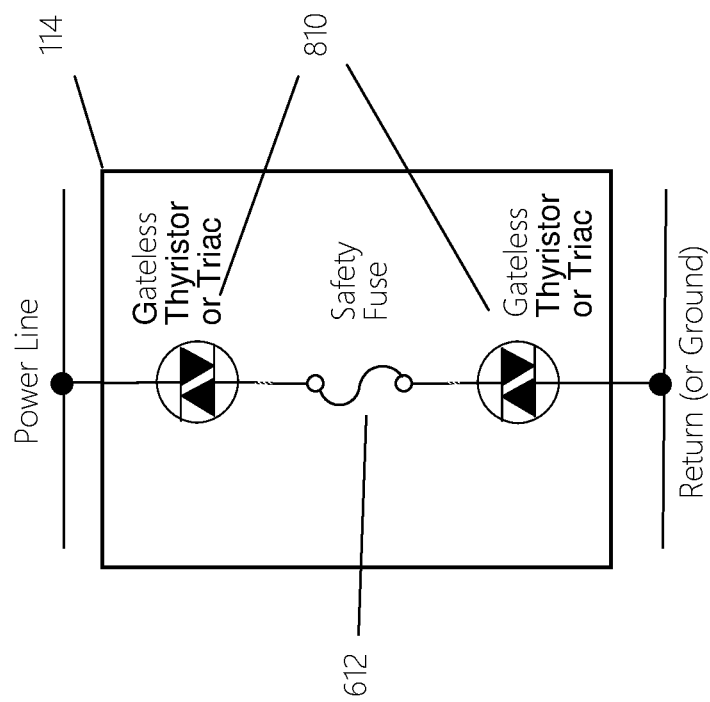
FIG. 8 illustrates a schematic diagram of the gateless thyristor or triac embodiment of the crowbar stage according to embodiments of the present inventions.

FIG. 8 illustrates a schematic diagram of the gateless thyristor or triac embodiment of the crowbar stage according to embodiments of the present inventions. Numerous embodiments of the crowbar 610 are possible, including using one or more stacked gateless thyristors or triacs 810, as shown in FIG. 8. In this case, the thyristors or triacs 810 are kept off by selecting devices whose combined off-state voltages are above the clamping voltage of the transient voltage suppressor 312. This ensures that the thyristors or triacs 810 remain off until the transient voltage suppressor 312 has failed. The thyristors or triacs 810 can be stacked in series to achieve the desired turn-on voltage. This allows the same general design to be used for different voltage levels. A slow-blow safety fuse 612 can also be included in series with the thyristor(s) or triac(s) 810 to act as a safety mechanism in case the short-circuit current flowing through the crowbar 610 fails to trip an upstream protective device 120, such as a breaker or in-line fuse.

Figure 9:
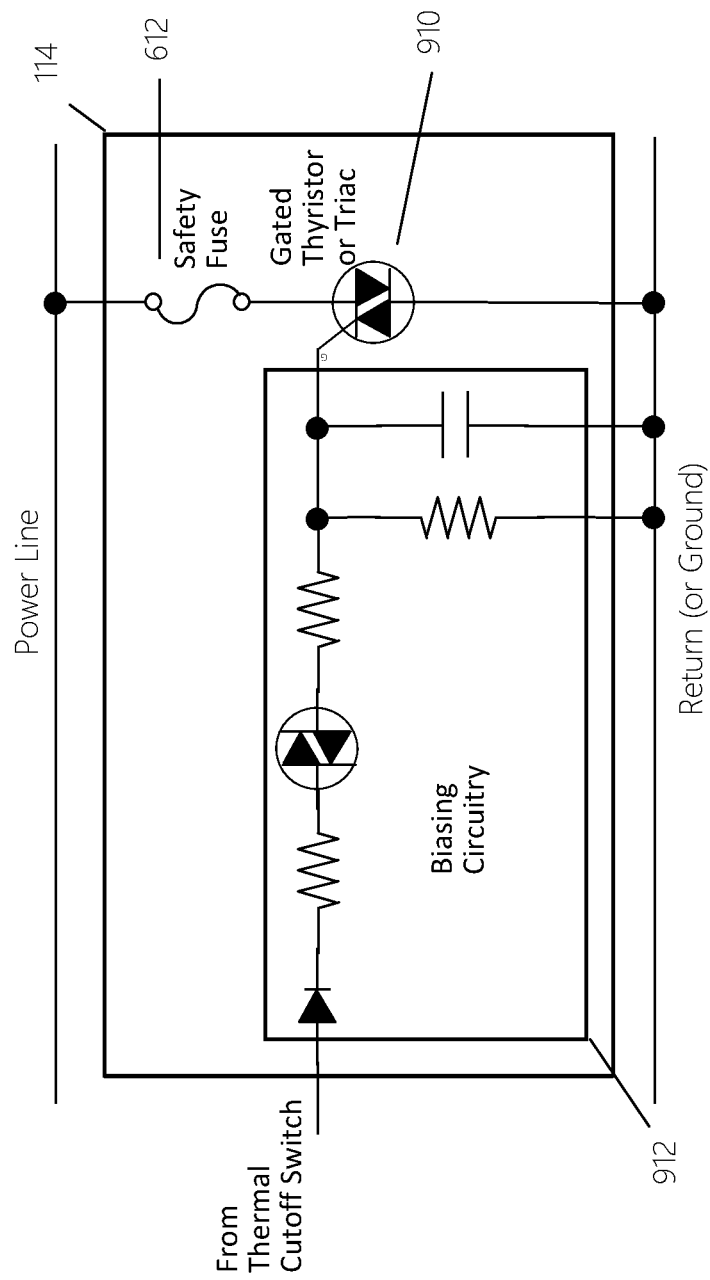
FIG. 9 illustrates a schematic diagram of the gated thyristor or triac embodiment of the crowbar stage according to embodiments of the present inventions.

FIG. 9 illustrates a schematic diagram of the gated thyristor or triac embodiment of the crowbar stage according to embodiments of the present inventions. A second crowbar design, shown in FIG. 9, uses a thyristor or triac 910 whose gate is pulsed by current resulting from the failure of the transient voltage suppressor 312. When the thermal cutoff 410 opens the current path of the transient voltage suppressor 312, current is allowed to flow into the gate of the thyristor or triac 910, thereby pulsing it on. Once enabled, the thyristor or triac 910 acts as a short between the power line and return. This, in turn, draws enough current to open an upstream protective device 120, such as a breaker or in-line fuse. Conditioning circuitry is typically required to properly drive the thyristor or triac 910. In addition, a safety fuse 612 could be included to protect against the case of the upstream protective device 120 not tripping. A simple embodiment of such circuitry is shown in FIG. 9. Once again, even though gated, it is important that a turn-on voltage of the thyristor or triac 910 is greater than the clamping voltage of the transient voltage suppressor 312 to prevent unwanted activation.

Figure 10:
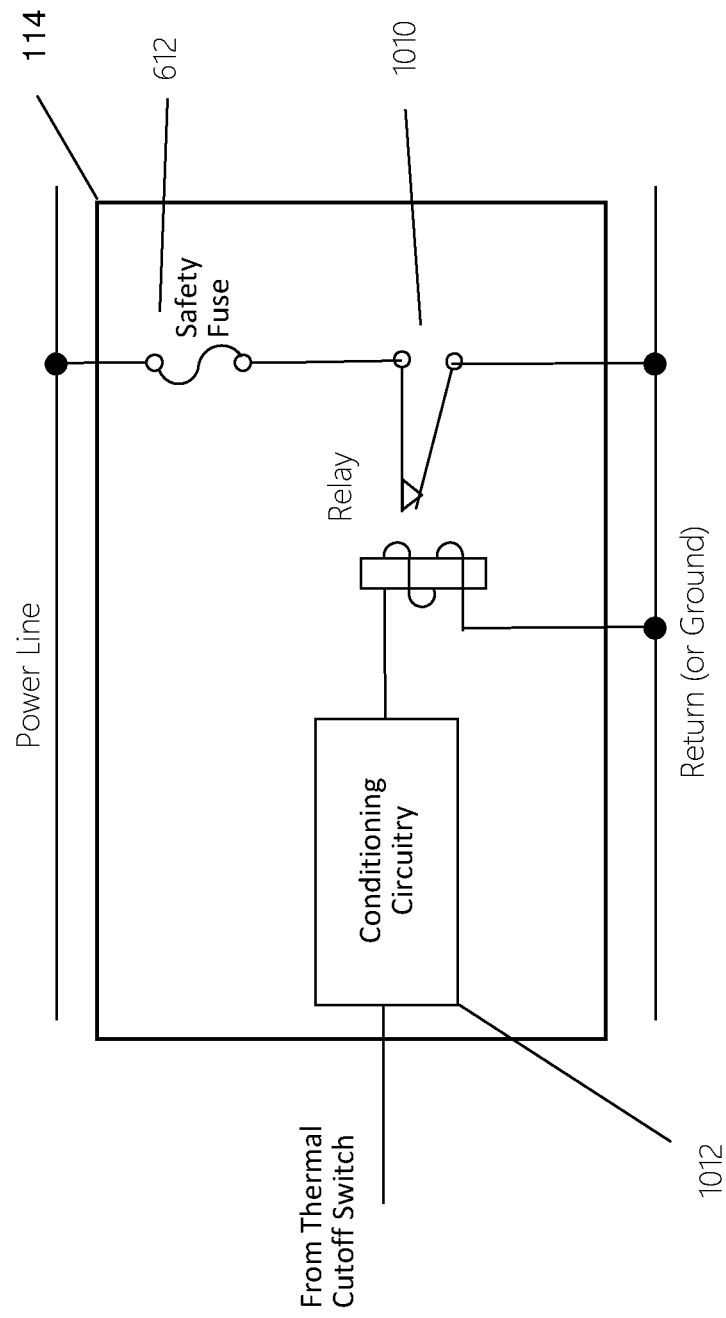
FIG. 10 illustrates a schematic diagram of the relay embodiment of the crowbar stage according to embodiments of the present inventions.

FIG. 10 illustrates a schematic diagram of the relay embodiment of the crowbar stage according to embodiments of the present inventions. A third crowbar design, shown in FIG. 10 uses a relay 1010 whose coil is activated by the opening of the transient voltage suppressor's thermal cutoff 310. In the case of the relay design, additional conditioning circuitry 1012 may be necessary to ensure that the resulting pulse can safely and effectively activate the relay 1010. For example, in the case of AC power and a DC relay, the conditioning circuitry 1012 might consist of a rectifier and a small DC-DC converter to set the impulse at the correct coil turn-on voltage. Additionally, the relay 1010 can either be pulsed by the failure event, or it could be latched with external circuitry or with the use of a latching relay. In addition, a safety fuse 612 could be included to protect against the case of the upstream protective device 120 not tripping.

Figure 11:
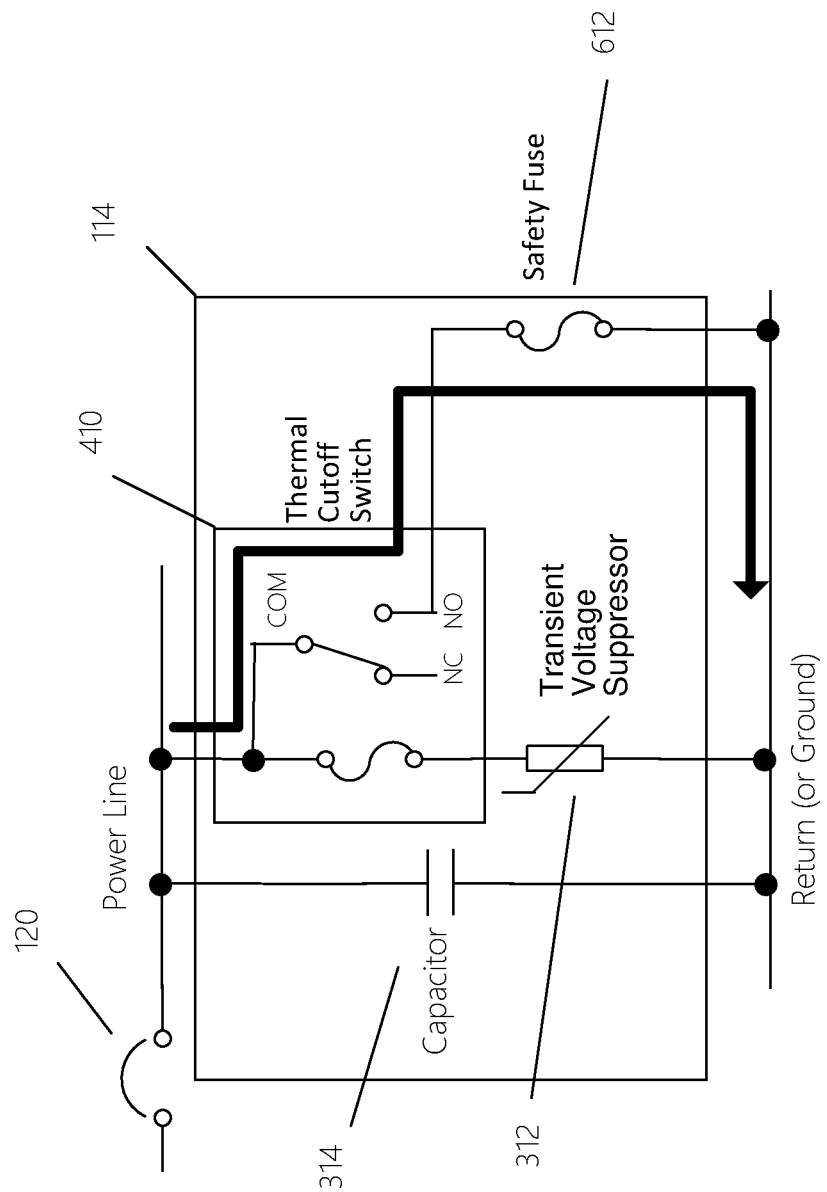
FIG. 11 illustrates a schematic diagram of the direct thermal cutoff switch embodiment of the crowbar stage according to embodiments of the present inventions.

FIG. 11 illustrates a schematic diagram of the direct thermal cutoff switch embodiment of the crowbar stage according to embodiments of the present inventions. A fourth crowbar design, shown in FIG. 11, passes the power through the transient voltage suppressor's thermal cutoff switch 410 directly. When the transient voltage suppressor 312 fails, the cutoff switch 410 shorts Power line to Return (or Ground), once again drawing enough current to activate an upstream protective device 120, such as a breaker or in-line fuse. As with the other embodiments, a safety fuse 612 could be included to protect against the case of the upstream protective device 120 not tripping.

In every case, the activation of the crowbar 610 is designed to trip an upstream protective device 120, such as a fuse or circuit breaker, thus disconnecting the protected load 116 from the incoming power feed. If the surge protection device was wired in series with the protected load 116, the upstream protective device 120 could be part of the surge protection device. If the surge protection device was wired in parallel, as shown in FIG. 1, the upstream protective device 120, such as a breaker or fuse, could be external to the surge protection device, such as housed in a nearby breaker panel. The crowbar circuit 114 offers protection against long-duration transients that would normally result in the failure of conventional surge protection technologies, including gas discharge tube, metal oxide varistors, and transient voltage suppression diodes.

FIG. 11 shows one embodiment of the three-stage surge protection device. Each of the three-stages work in conjunction with the other two. The RC snubber circuit 110 acts to smooth and broaden very fast transients that might cause the crowbar circuit 114 to inadvertently trip. This is because without the RC snubber circuit 110, very fast high-voltage transients might cause the circuit to enter a race condition in which the transient voltage suppressor circuit 112 and the crowbar circuit 114 were both trying to turn on simultaneously. If the crowbar circuit 114 managed to turn on before the transient voltage suppressor circuit 112 could clamp the incoming transient, the crowbar circuit 114 would short the power line to return (or ground), unnecessarily tripping the upstream protective device 120. Likewise, the transient voltage suppressor circuit 112 ensures that medium-duration transients are kept below the crowbar circuit's 114 turn-voltage. Finally, the crowbar circuit 114 can either be enabled or activated by the failure of the transient voltage suppressor circuit 112, likely due to a long-duration transient. Even with the crowbar circuit 114 enabled (but not activated), the RC snubber circuit 110 continues to prevent fast transients from unnecessarily activating the crowbar circuit 114.

In summary, the invention suppresses short- and medium-duration transients using the RC snubber 110 and transient voltage suppressor 112 stages. Long-duration transients are suppressed when the crowbar circuit 114 activates and trips an upstream protective device 120, such as a breaker or in-line fuse. To the best of my knowledge, the use of a multi-stage design that incorporates a low-pass filter with damping, a transient voltage suppressor, and a crowbar has not previously been developed. Furthermore, purposefully activating or enabling a crowbar circuit 114 by the failure of a transient voltage suppressor 112 for purposes of tripping an upstream protection device 120 is novel and previously unseen in commercial surge protection devices. The broad protection provided is not available in current surge protection devices and would be critical to protecting electronics from complex transient waveforms.

Figure 12:
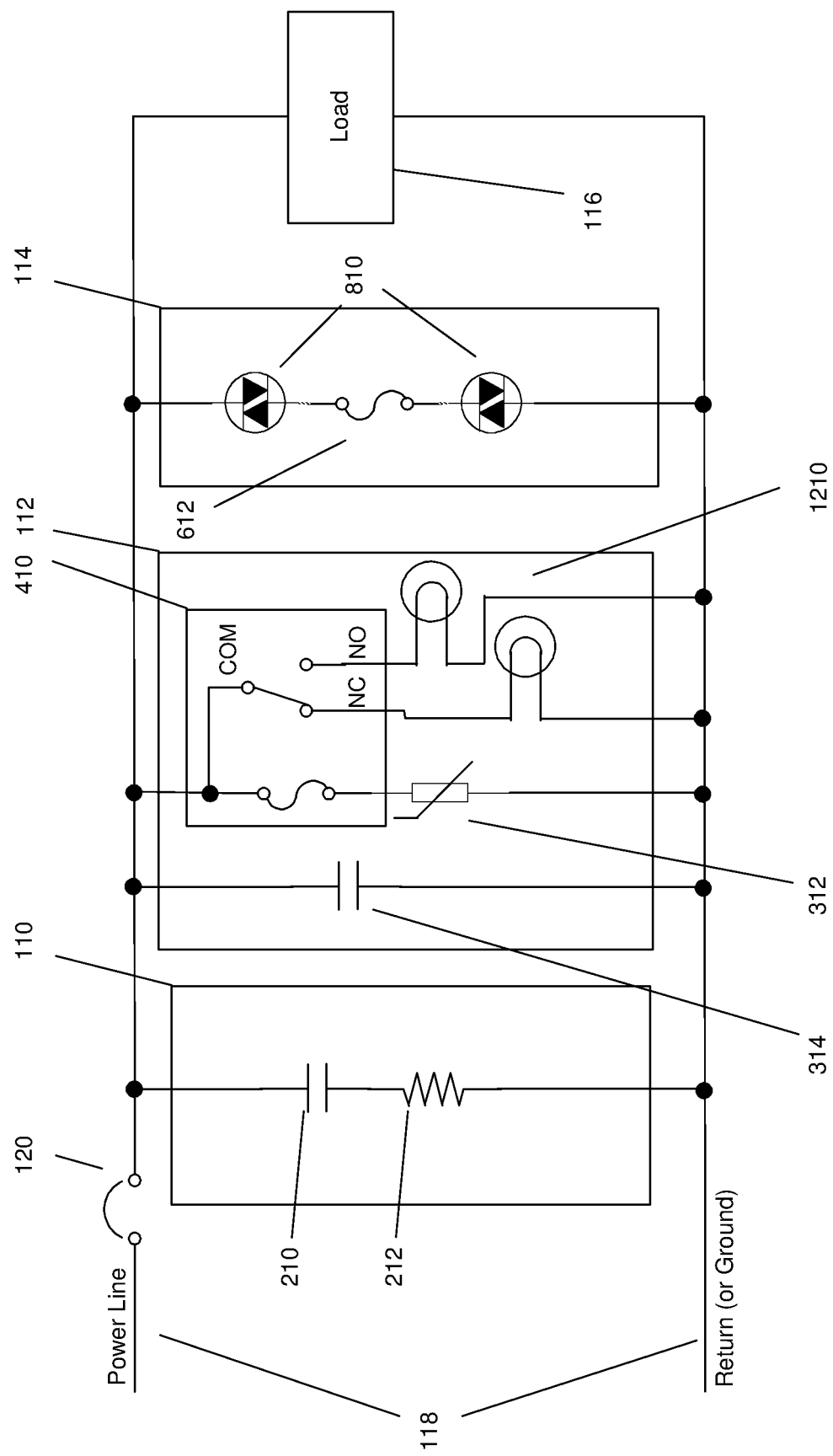
FIG. 12 illustrates a schematic diagram of one embodiment of the three-stage surge protection device according to embodiments of the present inventions.

FIG. 12 illustrates a schematic diagram of one embodiment of the three-stage surge protection device according to embodiments of the present inventions. In this figure, the elements of the three-stage design are present, including a low-pass filter with damping 110 (embodied as a capacitor 210 and a snubbing resistor 212), a hybrid transient voltage suppressor (embodied as the parallel capacitor 314, the thermal cutoff switch 410, the metal oxide varistor 312, and indicator lights 1210), and a crowbar (embodied as stacked gateless thyristors 810 and a slow-blow fuse 812).

Figure 13:
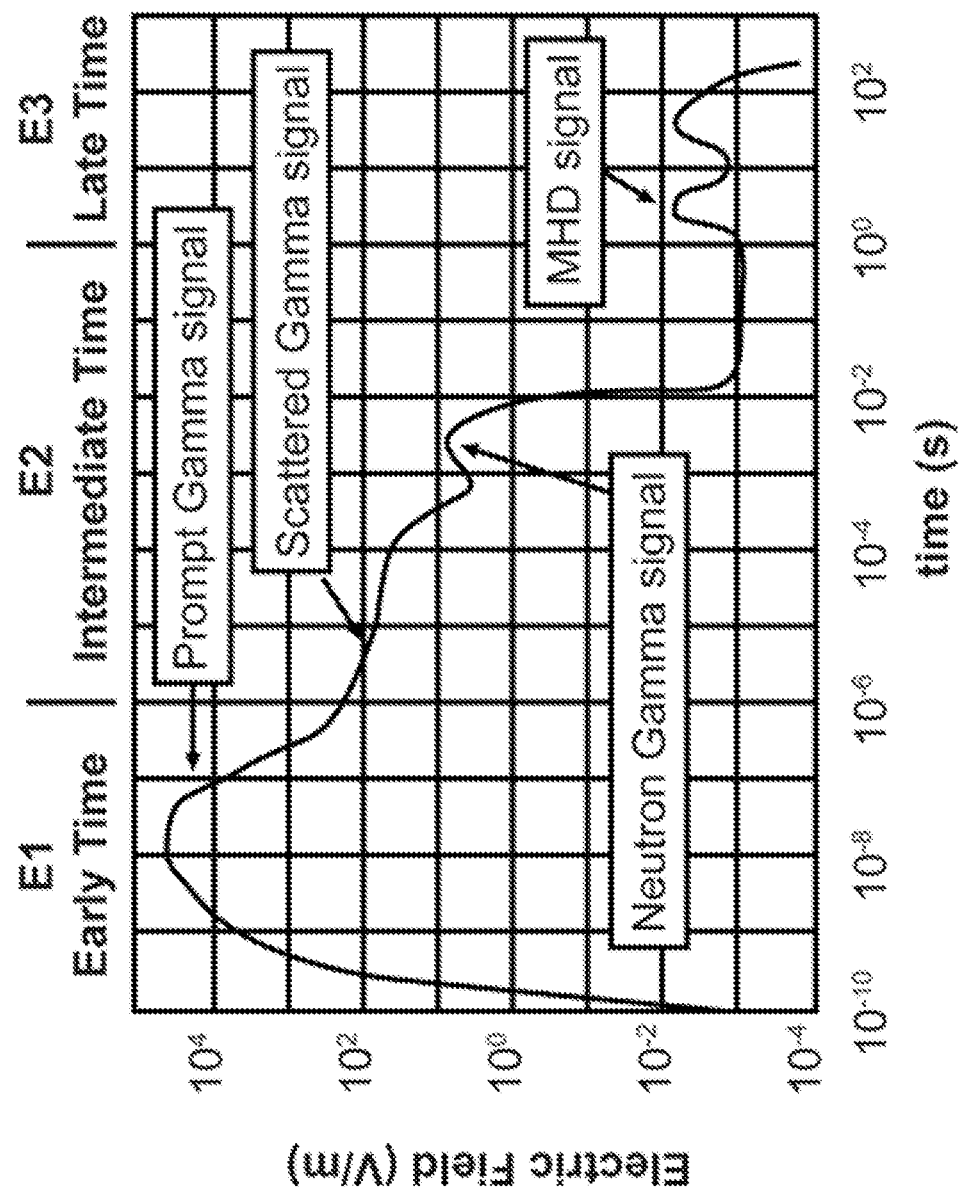
FIG. 13 illustrates a plot showing characteristics of a high-altitude nuclear-generated electromagnetic pulse (EMP) waveform over time.

FIG. 13 illustrates a plot showing characteristics of a high-altitude nuclear-generated electromagnetic pulse (EMP) waveform over time. An EMP results in a complex transient disturbance with three distinct components, identified as E1, E2, and E3 in FIG. 12. The early time E1 component is typically assumed to have a rise time of approximately 5 ns and a pulse width of approximately 1,000 ns. It is followed by the intermediate time waveform component, E2, which is assumed to have a pulse width ranging from 1 microsecond to 1 second Finally, the E2 is followed by E3, a late time pulse that might last tens to hundreds of seconds. The invention described herein would be the first of its kind to provide protection from all three EMP transient components.

Examples of Intended Uses

One example of use is protecting homes, businesses, recreational vehicles, boats, automobiles (i.e., trucks/cars/motorcycles), solar power generation systems, and generators from the effects of a nuclear-generated high-altitude electromagnetic pulse (EMP), as described above.

Another example of use is protecting homes, businesses, recreational vehicles, boats, automobiles, solar generation systems, and generators from the effects of a geomagnetic storm resulting from a solar event, such as a coronal mass ejection or solar flare. Solar events such as these can cause powerful geomagnetic storms to be felt at the earth's surface. Such storms couple unwanted energy into long conductors, such as utility transmission lines and buried pipes. The resulting transient that flows along the conductors is similar to the E3 pulse of an EMP, lasting seconds, minutes, or even hours in duration. The inventions described herein would be the first of its kind to protect against this long-duration transient resulting from a solar-induced geomagnetic storm.

A third example of use for the invention is protecting homes, businesses, recreational vehicles, boats, automobiles, solar generation systems, and generators from the effects of an overvoltage condition on the utility power feed caused by load shedding or some type of power system anomaly. While most surge protection devices can guard against brief transients (i.e., those lasting microseconds or less), none currently protect against long-duration overvoltage conditions. The invention described herein would be the first of its kind to protect against both short- and long-duration overvoltage conditions introduced by utility company failures and anomalies.

In all three examples, the invention is readily added to the power distribution systems of homes, businesses, recreational vehicles, automobiles, solar generation systems, or generators.

Figure 14:
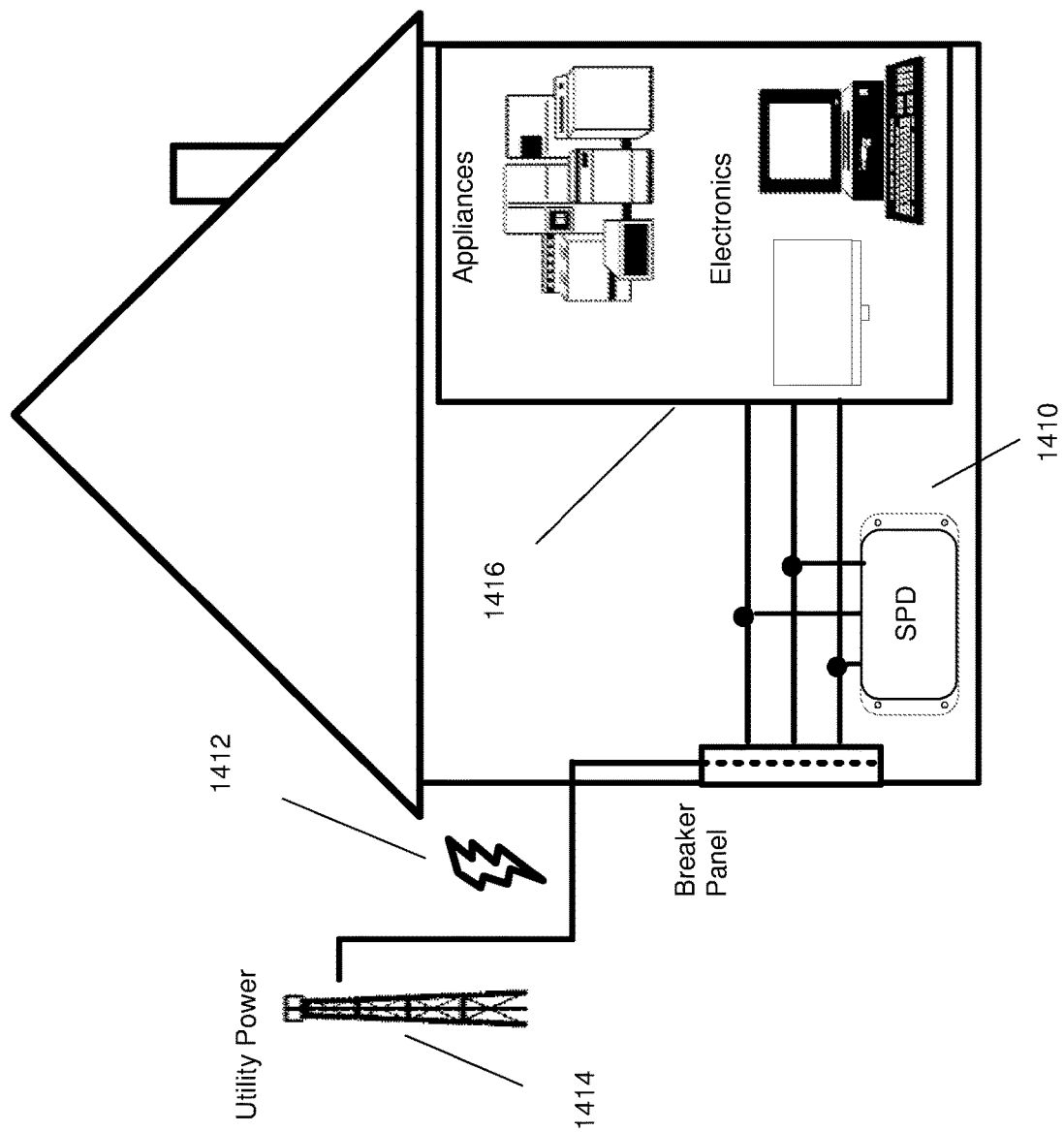
FIG. 14 illustrates a diagram showing an example of how a surge protection device (SPD) using the invention could protect electronic loads in a building according to embodiments of the present inventions.

FIG. 14 is a diagram showing an example of how a surge protection device (SPD) using the invention could be used to protect a home's or business's electronic loads. FIG. 14. illustrates how a surge protection device 1410 built with the described invention might be used to protect a home's electronics 1416 from a power line transient 1412 that came in on the utility power lines 1414 according to embodiments of the present inventions.

Figure 15:
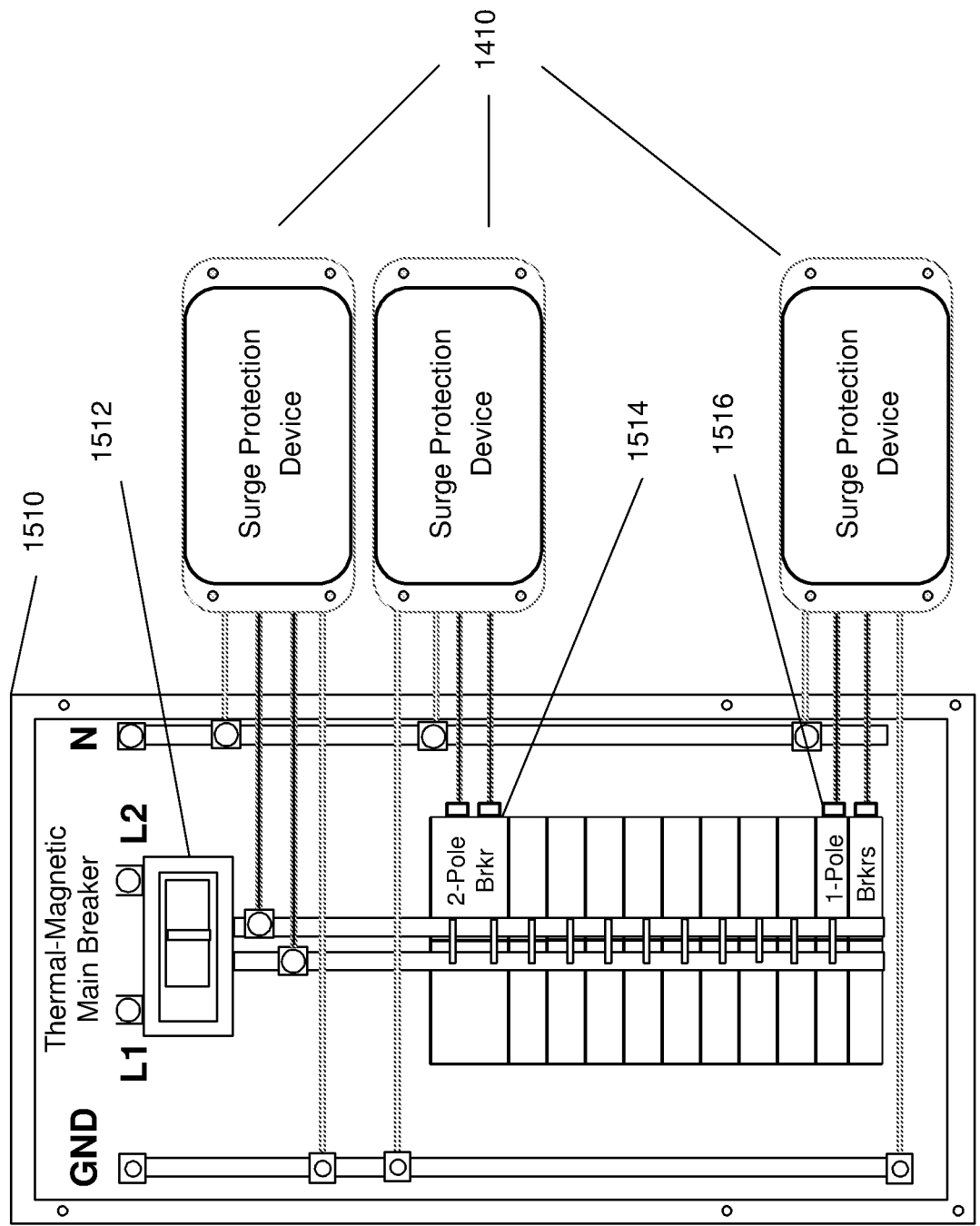
FIG. 15 illustrates a diagram showing examples of how a surge protection device using embodiments of the invention could be connected to an existing electrical distribution system in a building according to embodiments of the present inventions.

FIG. 15 is a diagram showing an example of how a surge protection device using embodiments of the invention could be connected to an existing electrical distribution system in a building such as a home or business according to embodiments of the present inventions. FIG. 15 illustrates several methods in which a surge protection device (SPD) 1410 built with the described invention might connect to a home's breaker panel 1510. The SPD 1410 could attach either directly to the output side of the main breaker 1512, to the output of a double-pole secondary breaker 1514, or to the output of one or more single-pole secondary breakers 1516. If the SPD 1410 were connected to the main breaker 1512, it would provide protection from short- and medium-duration transients using the RC Snubber circuit 110 and transient voltage suppressor circuits 112, and it would protect from long-duration transients by activating the crowbar circuit 114. The crowbar circuit 114 would trip the main breaker 1512 and, in turn, disconnect the input power feed 118 from the protected load 116. If the SPD 1410 were connected to one or more slower-tripping, thermal or high-magnetic secondary breakers 1514 or 1516, it would still be possible to trip the main breaker 1512, assuming the main breaker 1512 was a faster-tripping thermal-magnetic model than the thermal or high-magnetic secondary breakers 1514 or 1516. This is because thermal and high-magnetic secondary breakers require a significantly greater multiple of the breaker's rated current to trip quickly, either through thermal or magnetic action.

If the SPD 1410 were connected to one or more slower-tripping, thermal or high-magnetic secondary breakers 1516, it would still be possible to trip the main breaker 1512, assuming the main breaker was a faster-tripping thermal-magnetic model.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. In a power distribution system having an upstream breaker/fuse connected to a power line, an apparatus for protection from voltage transients, the apparatus comprising:
   a low-pass filter operatively coupled across the power line and the return line of the power distribution system;
   a transient voltage suppressor operatively coupled across the power line and the return line of the power distribution system to suppress voltage transients to a clamping voltage, wherein the transient voltage suppressor fails to suppress the voltage transients to the clamping voltage when a voltage of the transient rises above a crowbar activation voltage, wherein the crowbar activation voltage is higher than the clamping voltage; and
   a crowbar operatively coupled to both the return line and through the power line to the breaker/fuse of the power distribution system in a configuration to short the power line to the return line to open the breaker/fuse when the transient voltage suppressor fails to suppress the voltage transients to the clamping voltage.

2. In a power distribution system having an upstream breaker/fuse, the apparatus according to claim 1, wherein the low-pass filter further comprises a capacitor and a resistor in series with the capacitor, wherein the capacitor is sized to limit a maximum rate of change of the transient entering the apparatus, and wherein the resistor is sized to dampen ringing within the apparatus resulting from the voltage transient.

3. In a power distribution system having a return line and having an upstream breaker/fuse connected to a power line, an apparatus for protection from voltage transients, the apparatus comprising:
   a low-pass filter operatively coupled across the power line and the return line of the power distribution system, wherein the low-pass filter has a corner frequency sufficient to slow a rise time of high-frequency components of the voltage transients for the transient voltage suppressor to have time to suppress the high-frequency components to the clamping voltage;
   a transient voltage suppressor operatively coupled across the power line and the return line of the power distribution system to suppress voltage transients to a clamping voltage; and a crowbar operatively coupled to both the return line and through the power line to the breaker/fuse of the power distribution system in a configuration to short the power line to the return line to open the breaker/fuse when the transient voltage suppressor fails to suppress the voltage transients to the clamping voltage.

4. In a power distribution system having an upstream breaker/fuse, the apparatus according to claim 1, wherein the transient voltage suppressor comprises a varistor or metal oxide varistor.

5. In a power distribution system having an upstream breaker/fuse, the apparatus according to claim 1, wherein the transient voltage suppressor is chosen from the group consisting of metal oxide varistors, transient voltage suppression diodes, gas discharge tubes, and avalanche diodes.

6. In a power distribution system having an upstream breaker/fuse connected to a power line, an apparatus for protection from voltage transients, the apparatus comprising:
   a low-pass filter operatively coupled across the power line and the return line of the power distribution system;
   a transient voltage suppressor operatively coupled across the power line and the return line of the power distribution system to suppress voltage transients to a clamping voltage, wherein the transient voltage suppressor comprises a failure detection component to produce a failure status signal indicative of a failure condition; and
   a crowbar operatively coupled to both the return line and through the power line to the breaker/fuse of the power distribution system in a configuration to short the power line to the return line to open the breaker/fuse when the transient voltage suppressor fails to suppress the voltage transients to the clamping voltage, wherein the crowbar comprises a thyristor or a triac and wherein the thyristor or triac comprises a gate pulsed by current resulting from the failure status signal from the transient voltage suppressor.

7. In a power distribution system having an upstream breaker/fuse, the apparatus according to claim 6, wherein the transient voltage suppressor fails to suppress the voltage transients to the clamping voltage when the failure condition is indicated by the failure status signal.

8. In a power distribution system having an upstream breaker/fuse, the apparatus according to claim 6, wherein the failure detection component comprises a thermal cutoff switch.

9. In a power distribution system having an upstream a main breaker/fuse connected to a power line, an apparatus for protection from voltage transients, the apparatus comprising:
   a low-pass filter operatively coupled across the power line and the return line of the power distribution system;
   a transient voltage suppressor operatively coupled across the power line and the return line of the power distribution system to suppress voltage transients to a clamping voltage; and
   a crowbar operatively coupled to both the return line and through the power line to the breaker/fuse of the power distribution system in a configuration to short the power line to the return line to open the breaker/fuse when the transient voltage suppressor fails to suppress the voltage transients to the clamping voltage, wherein the crowbar is sensitive to both low-frequency and high-frequency components in the voltage transients; and
   wherein the low-pass filter has a corner frequency below a frequency of the high-frequency components to prevent shorting by the crowbar upon the high-frequency components so that the crowbar trips only when the transient voltage suppressor fails to suppress the voltage transients to the clamping voltage.

10. In a power distribution system having an upstream breaker/fuse, the apparatus according to claim 1, wherein the crowbar comprises a thyristor or a triac.

11. In a power distribution system having an upstream breaker/fuse, the apparatus according to claim 10, wherein the crowbar comprises a series of thyristors or triacs.

12. In a power distribution system having an upstream breaker/fuse, the apparatus according to claim 10, wherein the thyristor or triac has a turn-on voltage greater than the clamping voltage of the transient voltage suppressor to prevent unwanted activation.

13. In a power distribution system having an upstream breaker/fuse, the apparatus according to claim 1, wherein the crowbar comprises a relay gated by the failure status signal from the transient voltage suppressor.

14. In a power distribution system having an upstream breaker/fuse, the apparatus according to claim 1, wherein the crowbar is chosen from the group consisting of a thyristor, a series of stacked thyristors, a triac, a series of stacked triacs, and a relay.

15. In a power distribution system having an upstream breaker/fuse, the apparatus according to claim 1, further comprising a safety fuse in series with the crowbar.

16. In a power distribution system having an upstream breaker/fuse, wherein the apparatus of claim 1 is connected through a secondary upstream breaker/fuse slower-tripping than a further upstream main breaker/fuse.

17. In a power distribution system having an upstream breaker/fuse, wherein the apparatus of claim 16 is connected through the further upstream main breaker/fuse which is a thermal-magnetic main breaker.

18. In a power distribution system having an upstream breaker/fuse, the apparatus according to claim 9, wherein the low-pass filter further comprises a capacitor and a resistor in series with the capacitor, wherein the capacitor is sized to limit a maximum rate of change of the transient entering the apparatus, and wherein the resistor is sized to dampen ringing within the apparatus resulting from the voltage transient.

19. In a power distribution system having an upstream breaker/fuse, the apparatus according to claim 9, wherein the transient voltage suppressor comprises a varistor or metal oxide varistor.

20. In a power distribution system having an upstream breaker/fuse, the apparatus according to claim 9, wherein the transient voltage suppressor is chosen from the group consisting of metal oxide varistors, transient voltage suppression diodes, gas discharge tubes, and avalanche diodes.

21. In a power distribution system having an upstream breaker/fuse, the apparatus according to claim 9, wherein the crowbar comprises a thyristor or a triac.

22. In a power distribution system having an upstream breaker/fuse, the apparatus according to claim 21, wherein the crowbar comprises a series of thyristors or triacs.

23. In a power distribution system having an upstream breaker/fuse, the apparatus according to claim 21, wherein the thyristor or triac has a turn-on voltage greater than the clamping voltage of the transient voltage suppressor to prevent unwanted activation.

24. In a power distribution system having an upstream breaker/fuse, the apparatus according to claim 9, wherein the crowbar comprises a relay gated by the failure status signal from the transient voltage suppressor.

25. In a power distribution system having an upstream breaker/fuse, the apparatus according to claim 9, wherein the crowbar is chosen from the group consisting of a thyristor, a series of stacked thyristors, a triac, a series of stacked triacs, and a relay.

26. In a power distribution system having an upstream breaker/fuse, the apparatus according to claim 9, further comprising a safety fuse in series with the crowbar.

27. In a power distribution system having an upstream breaker/fuse, wherein the apparatus of claim 9 is connected through a secondary upstream breaker/fuse slower-tripping than a further upstream main breaker/fuse.

28. In a power distribution system having an upstream breaker/fuse, wherein the apparatus of claim 27 is connected through the further upstream main breaker/fuse which is a thermal-magnetic main breaker.

29. In a power distribution system having an upstream breaker/fuse, the apparatus according to claim 8, wherein the low-pass filter further comprises a capacitor and a resistor in series with the capacitor, wherein the capacitor is sized to limit a maximum rate of change of the transient entering the apparatus, and wherein the resistor is sized to dampen ringing within the apparatus resulting from the voltage transient.

30. In a power distribution system having an upstream breaker/fuse, the apparatus according to claim 8, wherein the transient voltage suppressor comprises a varistor or metal oxide varistor.

31. In a power distribution system having an upstream breaker/fuse, the apparatus according to claim 8, wherein the transient voltage suppressor is chosen from the group consisting of metal oxide varistors, transient voltage suppression diodes, gas discharge tubes, and avalanche diodes.

32. In a power distribution system having an upstream breaker/fuse, the apparatus according to claim 8, wherein the crowbar comprises a thyristor or a triac.

33. In a power distribution system having an upstream breaker/fuse, the apparatus according to claim 32, wherein the crowbar comprises a series of thyristors or triacs.

34. In a power distribution system having an upstream breaker/fuse, the apparatus according to claim 32, wherein the thyristor or triac has a turn-on voltage greater than the clamping voltage of the transient voltage suppressor to prevent unwanted activation.

35. In a power distribution system having an upstream breaker/fuse, the apparatus according to claim 8, wherein the crowbar comprises a relay gated by the failure status signal from the transient voltage suppressor.

36. In a power distribution system having an upstream breaker/fuse, the apparatus according to claim 8, wherein the crowbar is chosen from the group consisting of a thyristor, a series of stacked thyristors, a triac, a series of stacked triacs, and a relay.

37. In a power distribution system having an upstream breaker/fuse, the apparatus according to claim 8, further comprising a safety fuse in series with the crowbar.

38. In a power distribution system having an upstream breaker/fuse, wherein the apparatus of claim 8 is connected through a secondary upstream breaker/fuse slower-tripping than a further upstream main breaker/fuse.

39. In a power distribution system having an upstream breaker/fuse, wherein the apparatus of claim 38 is connected through the further upstream main breaker/fuse which is a thermal-magnetic main breaker.

40. In a power distribution system having an upstream breaker/fuse, the apparatus according to claim 3, wherein the low-pass filter further comprises a capacitor and a resistor in series with the capacitor, wherein the capacitor is sized to limit a maximum rate of change of the transient entering the apparatus, and wherein the resistor is sized to dampen ringing within the apparatus resulting from the voltage transient.

41. In a power distribution system having an upstream breaker/fuse, the apparatus according to claim 3, wherein the transient voltage suppressor comprises a varistor or metal oxide varistor.

42. In a power distribution system having an upstream breaker/fuse, the apparatus according to claim 3, wherein the transient voltage suppressor is chosen from the group consisting of metal oxide varistors, transient voltage suppression diodes, gas discharge tubes, and avalanche diodes.

43. In a power distribution system having an upstream breaker/fuse, the apparatus according to claim 3, wherein the crowbar comprises a thyristor or a triac.

44. In a power distribution system having an upstream breaker/fuse, the apparatus according to claim 43, wherein the crowbar comprises a series of thyristors or triacs.

45. In a power distribution system having an upstream breaker/fuse, the apparatus according to claim 43, wherein the thyristor or triac has a turn-on voltage greater than the clamping voltage of the transient voltage suppressor to prevent unwanted activation.

46. In a power distribution system having an upstream breaker/fuse, the apparatus according to claim 3, wherein the crowbar comprises a relay gated by the failure status signal from the transient voltage suppressor.

47. In a power distribution system having an upstream breaker/fuse, the apparatus according to claim 3, wherein the crowbar is chosen from the group consisting of a thyristor, a series of stacked thyristors, a triac, a series of stacked triacs, and a relay.

48. In a power distribution system having an upstream breaker/fuse, the apparatus according to claim 3, further comprising a safety fuse in series with the crowbar.

49. In a power distribution system having an upstream breaker/fuse, wherein the apparatus of claim 3 is connected through a secondary upstream breaker/fuse slower-tripping than a further upstream main breaker/fuse.

50. In a power distribution system having an upstream breaker/fuse, wherein the apparatus of claim 49 is connected through the further upstream main breaker/fuse which is a thermal-magnetic main breaker.

* * * * *